(12) United States Patent
Kunisada et al.

(10) Patent No.: US 10,377,337 B2
(45) Date of Patent: Aug. 13, 2019

(54) VEHICLE OCCUPANT RESTRAINING SYSTEM

(71) Applicant: TOYOTA JIDOSHA KABUSHIKI KAISHA, Toyota-shi (JP)

(72) Inventors: Masato Kunisada, Susono (JP); Hiroyuki Nagura, Chiryu (JP); Takuma Kawai, Susono (JP); Takayuki Iwakawa, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 140 days.

(21) Appl. No.: 15/642,713

(22) Filed: Jul. 6, 2017

(65) Prior Publication Data

US 2018/0022308 A1 Jan. 25, 2018

(30) Foreign Application Priority Data

Jul. 22, 2016 (JP) ................................ 2016-144900

(51) Int. Cl.
| | | |
|---|---|---|
| *B60R 21/207* | (2006.01) | |
| *B60R 21/233* | (2006.01) | |
| *B60R 21/26* | (2011.01) | |
| *B60R 21/01* | (2006.01) | |
| *B60R 21/231* | (2011.01) | |

(52) U.S. Cl.
CPC ...... *B60R 21/23138* (2013.01); *B60R 21/207* (2013.01); *B60R 21/233* (2013.01); *B60R 21/26* (2013.01); *B60R 2021/01231* (2013.01); *B60R 2021/23107* (2013.01); *B60R 2021/23146* (2013.01); *B60R 2021/26058* (2013.01)

(58) Field of Classification Search
CPC .......... B60R 2021/23107; B60R 2021/23146; B60R 21/207; B60R 2021/01231; B60R 2021/26058; B60R 21/233
See application file for complete search history.

(56) References Cited

U.S. PATENT DOCUMENTS

| | | | | |
|---|---|---|---|---|
| 7,819,421 B2* | 10/2010 | Naito | ................ | B60R 21/23138 280/730.2 |
| 8,702,123 B2* | 4/2014 | Mazanek | .............. | B60R 21/207 280/729 |
| 9,056,592 B1* | 6/2015 | Kline | .................. | B60R 21/2334 |
| 9,403,500 B2* | 8/2016 | Ishida | ............... | B60R 21/01512 |

(Continued)

FOREIGN PATENT DOCUMENTS

| | | |
|---|---|---|
| JP | 2005-335616 | 12/2005 |
| JP | 2008-87631 | 4/2008 |

(Continued)

*Primary Examiner* — Ruth Ilan
(74) *Attorney, Agent, or Firm* — Oblon, McClelland, Maier & Neustadt, L.L.P.

(57) ABSTRACT

A vehicle occupant restraining system includes plural occupant restraining devices that are disposed in a side support portion of a seat back of a vehicle seat and is configured to, when activated, restrain an occupant; and a control device that is configured to staggers the activation timings of the plural occupant restraining devices so that a load that acts on the occupant simultaneously from the plural occupant restraining devices is made to be equal to or less than a maximum value of a load that acts on the occupant individually from the plural occupant restraining devices.

8 Claims, 10 Drawing Sheets

(56) References Cited

U.S. PATENT DOCUMENTS

| | | | | |
|---|---|---|---|---|
| 2003/0184061 A1* | 10/2003 | Honda | ............... | B60R 21/23138 280/730.2 |
| 2006/0255572 A1* | 11/2006 | Svenbrandt | ............ | B60R 21/207 280/730.2 |
| 2009/0020988 A1 | 1/2009 | Sato et al. | | |
| 2012/0123645 A1* | 5/2012 | Kwon | ................... | B60N 2/4235 701/46 |
| 2013/0147167 A1* | 6/2013 | Kwon | ................... | B60R 21/233 280/730.2 |
| 2015/0360636 A1 | 12/2015 | Kaneko et al. | | |
| 2017/0036634 A1* | 2/2017 | Ohno | ........................ | B60N 2/90 |
| 2017/0036641 A1* | 2/2017 | Ohno | ....................... | B60R 21/263 |
| 2018/0022309 A1* | 1/2018 | Kunisada | ............... | B60R 21/207 280/730.2 |
| 2018/0186326 A1* | 7/2018 | Kobayashi | ............ | A47C 31/02 |

FOREIGN PATENT DOCUMENTS

| | | |
|---|---|---|
| JP | 2009-23494 | 2/2009 |
| JP | 2014-80169 | 5/2014 |
| JP | 2014-151822 | 8/2014 |
| JP | 2015-58917 | 3/2015 |

\* cited by examiner

VEHICLE OCCUPANT RESTRAINING SYSTEM

CROSS-REFERENCE TO RELATED APPLICATION

This application is based on and claims priority under 35 USC 119 from Japanese Patent Application No. 2016-144900 filed on Jul. 22, 2016, the disclosure of which is incorporated by reference herein.

BACKGROUND

Technical Field

The present disclosure relates to a vehicle occupant restraining system provided at a side support portion of a seat back of a vehicle seat.

Related Art

Japanese Patent Application Laid-open (JP-A) No. 2008-087631 discloses a side airbag device in which, inside a side support portion of a seat back, an auxiliary inflating section (an inside airbag) is provided in a position further at a vehicle inner side than a main inflating section (a side airbag). The inside airbag, at the time of a side impact to the vehicle, inflates and deploys earlier than the side airbag and pushes the upper body of an occupant seated in a vehicle seat toward the vehicle inner side (the opposite side of the location of the impact) in a vehicle obliquely forward direction. Thereby, a wide space in which the side airbag may inflate and deploy is ensured so that the inflation and deployment is rapidly and reliably carried out.

However, in the side airbag device with the configuration described above, the inside airbag inflates and deploys when the side airbag inflates and deploys. At this time, a load from the side airbag and a load from the inside airbag combine and act on the occupant. In a case in which the total load exceeds the load resistance value of the occupant, the occupant becomes unable to be appropriately protected, so a measure such as lowering the loads that the individual airbags apply to the occupant becomes necessary. As a result, it becomes difficult to allow each airbag to exhibit its maximum performance and, therefore, there is room for improvement from the standpoint of more effectively protecting the occupant.

SUMMARY

In consideration of the above circumstances, the present disclosure provides a vehicle occupant restraining system that may appropriately and effectively protect an occupant.

A first aspect of the present disclosure is a vehicle occupant restraining system including: a side airbag device that is disposed in a side support portion of a seat back of a vehicle seat and that is configured to inflate and deploy a side airbag between a cabin side portion and an occupant; and an inside airbag device that is disposed in the side support portion and that is configured to inflate and deploy an inside airbag inside the side support portion; and the control device is configured to, in a case in which a side impact to the vehicle has been detected, inflate and deploy the inside airbag before the side airbag so that a load that acts on the occupant simultaneously from both the side airbag and the inside airbag is made to be equal to or less than a maximum value of a load that acts on the occupant individually from the side airbag and the inside airbag.

According to this aspect, in a case in which the control device has detected a side impact to the vehicle on the basis of the output from the crash sensor, the control device causes the inside airbag to inflate and deploy before the side airbag. Because of this, the load that acts on the occupant simultaneously from both the side airbag and the inside airbag is made equal to or less than the maximum value of the load that acts on the occupant individually from the side airbag and the inside airbag. Therefore, by setting the maximum value of the load that acts on the occupant individually from the side airbag and the inside airbag equal to or less than the load resistance value of the occupant, a load that exceeds the load resistance value may be prevented from acting on the occupant. In other words, it is possible to raise, as far as the load resistance value of the occupant, the maximum value of the load that acts on the occupant individually from the side airbag and the inside airbag. Thus, according to the present disclosure, it is possible to appropriately and effectively protect the occupant.

In the aspect, the vehicle occupant restraining system may further include a movable side support device that includes an air bladder disposed inside the side support portion, the movable side support device being configured capable of repeatedly inflating and deflating the air bladder inside the side support portion, wherein the control device is configured to, in a case in which it has predicted a side impact to the vehicle, inflate the air bladder before the inside airbag so that a load that acts on the occupant simultaneously from both the air bladder and the inside airbag is made to be equal to or less than a maximum value of a load that acts on the occupant individually from the side airbag and the inside airbag.

According to this configuration, in a case in which the control device has predicted a side impact to the vehicle on the basis of the output from the crash prediction sensor, the control device causes the air bladder to inflate inside the side support portion before the inside airbag. Because of this, the load that acts on the occupant simultaneously from both the air bladder and the inside airbag is made equal to or less than the maximum value of the load that acts on the occupant individually from the side airbag and the inside airbag. Therefore, by setting the maximum value of the load that acts on the occupant individually from the side airbag and the inside airbag equal to or less than the load resistance value of the occupant, a load that exceeds the load resistance value may be prevented from acting on the occupant. Moreover, the occupant continues to be restrained by the loads that the air bladder, the inside airbag, and the side airbag sequentially apply to the occupant and, therefore, it is possible to more effectively protect the occupant.

In the aspect, each of the side airbag device and the inside airbag device may include an individual inflator that is configured to supply a gas for inflation and deployment separately to the side airbag or the inside airbag, and the control device may be configured to stagger the activation timings of the individual inflators so that the inside airbag inflates and deploys before the side airbag.

In this configuration, the control device staggers the activation timings of the individual inflators as described above and, therefore, the inflation and deployment timings of the inside airbag and the side airbag may be arbitrarily set.

In the aspect, the side airbag device and the inside airbag device may jointly include a single inflator including a first gas generating unit that is configured to supply a gas for inflation and deployment to the side airbag and a second gas generating unit that is configured to supply a gas for inflation and deployment to the inside airbag, and the control device may be configured to stagger the activation timings of the first gas generating unit and the second gas generating unit so that the inside airbag inflates and deploys before the side airbagthe side airbag device and the inside airbag device may jointly have a single inflator equipped with a first gas generating unit that supplies a gas for inflation and deployment to the side airbag and a second gas generating unit that supplies a gas for inflation and deployment to the inside airbag, and the control device may stagger the activation timings of the first gas generating unit and the second gas generating unit to thereby cause the inside airbag to inflate and deploy before the side airbag.

In this configuration, the control device staggers the activation timings of the first gas generating unit and the second gas generating unit that are included in the single inflator as described above and, therefore, the inflation and deployment timings of the inside airbag and the side airbag may be arbitrarily set.

Another aspect of the present disclosure is a vehicle occupant restraining system including: plural occupant restraining devices that are disposed in a side support portion of a seat back of a vehicle seat and is configured to, when activated, restrain an occupant; and a control device that is configured to staggers the activation timings of the plural occupant restraining devices so that a load that acts on the occupant simultaneously from the plural occupant restraining devices is made to be equal to or less than a maximum value of a load that acts on the occupant individually from the plural occupant restraining devices.

According to this aspect, the control device staggers the activation timings of the plural occupant restraining devices disposed in the side support portion of the seat back of the vehicle seat. Because of this, the load that acts on the occupant simultaneously from the plural occupant restraining devices is made equal to or less than the maximum value of the load that acts on the occupant individually from plural occupant restraining devices. Therefore, by setting the maximum value of the load that acts on the occupant individually from the plural occupant restraining devices equal to or less than the load resistance value of the occupant, a load that exceeds the load resistance value may be prevented from acting on the occupant. In other words, it is possible to raise, as far as the load resistance value of the occupant, the maximum value of the load that acts on the occupant individually from the plural occupant restraining devices. Thus, according to the present disclosure, it is possible to appropriately and effectively protect the occupant.

As described above, the vehicle occupant restraining system pertaining to the present disclosure may appropriately and effectively protect an occupant.

BRIEF DESCRIPTION OF THE DRAWINGS

Exemplary embodiments of the present disclosure will be described in detail based on the following figures, wherein.

DETAILED DESCRIPTION

<First Embodiment>

Figure 1:
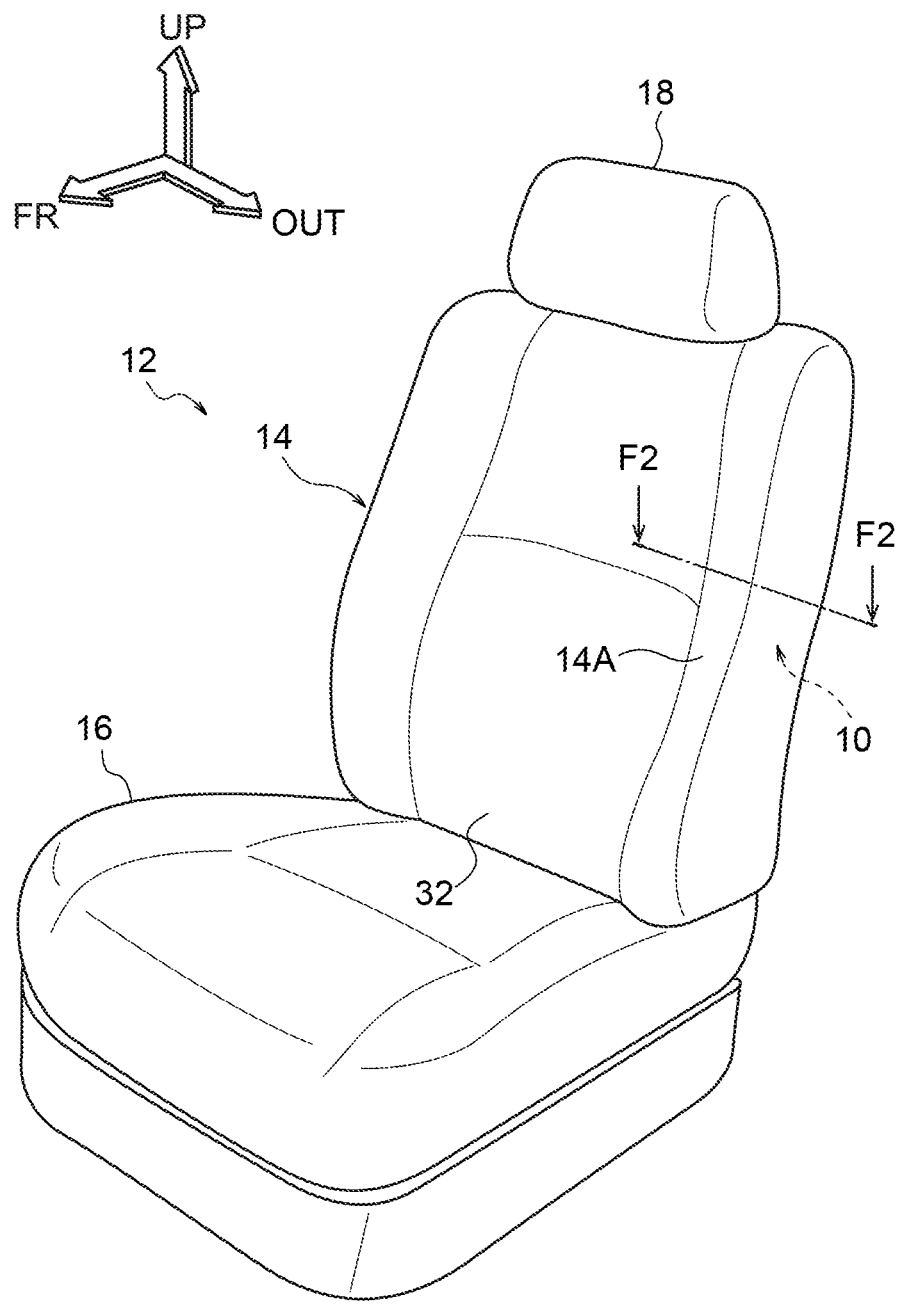
FIG. 1 is a perspective view of a vehicle seat to which a vehicle occupant restraining system pertaining to a first embodiment has been applied.

A vehicle occupant restraining system 10 pertaining to a first embodiment will be described below using FIG. 1 to FIG. 6. It should be noted that arrow FR, arrow UP, and arrow OUT appearing in the drawings indicate a forward direction (traveling direction), an upward direction, and an outward direction in the width direction of the vehicle, respectively. When description is given below simply using the directions of front/rear, right/left, and upper/lower, unless otherwise specified these will be understood to mean front/rear in the vehicle front-rear direction, right/left in the vehicle left-right direction (vehicle width direction), and upper/lower in the vehicle vertical direction.

Figure 2:
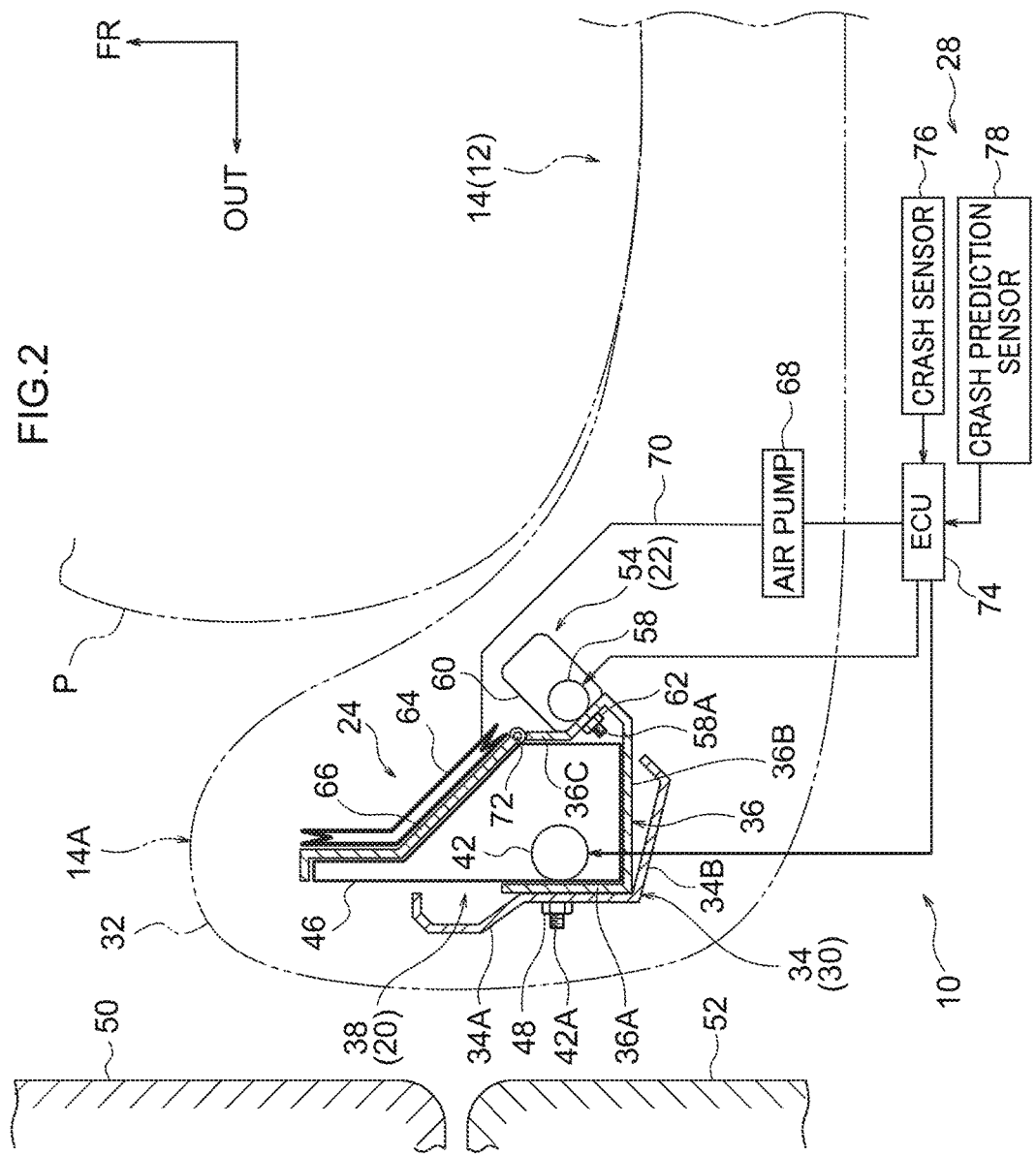
FIG. 2 is an enlarged cross-sectional view illustrating a cross section along line F2-F2 of FIG. 1.

As illustrated in FIG. 1 and FIG. 2, the vehicle occupant restraining system 10 pertaining to the present embodiment includes a side airbag device 20, an inside airbag device 22, and a movable side support device 24 (all of which are occupant restraining devices) that are disposed in a side support portion 14A located on the vehicle width direction outer side of a seat back 14 of a vehicle seat 12. Furthermore, the vehicle occupant restraining system 10 includes a control device 28 (illustrated only in FIG. 2) that controls the operation of the side airbag device 20, the inside airbag device 22, and the movable side support device 24.

The lower end portion of the seat back 14 is coupled to the rear end portion of a seat cushion 16, and a head rest 18 is coupled to the upper end portion of the seat back 14. The vehicle seat 12 is disposed on the left side in a cabin and serves as the driver's seat in a left-hand drive car or the front passenger seat in a right-hand drive car. The front-rear direction, the left-right direction (width direction), and the vertical direction of the vehicle seat 12 coincide with the front-rear direction, the left-right direction (width direction), and the vertical direction of the vehicle, respectively. In a case in which the vehicle seat 12 is disposed on the right side in the cabin, the configuration becomes bilaterally symmetrical to the configuration in the present embodiment.

FIG. 2 to FIG. 5 illustrate part of a crash test dummy P instead of an actual occupant. The dummy P is seated in the vehicle seat 12 in a regular posture determined by side impact test procedures. The dummy P is, for example, World Side Impact Dummy (WorldSID) AM50 (representing a 50th percentile American adult male). Below, in order to facilitate understanding of the description, the dummy P will be called "the occupant P."

As illustrated in FIG. 2 to FIG. 5, the seat back 14 includes a metal seat back frame 30 that is a frame member, a seat back pad (cushion) (not illustrated in the drawings) that is put over the seat back frame 30, and a seat cover 32 that covers the seat back pad. The seat back frame 30 includes an outer side frame 34, which is provided inside the side support portion 14A located on the vehicle width direction outer side of the seat back 14, and an inner side frame, which is provided inside a side support portion located on the vehicle width direction inner side of the seat back 14 (neither the inner side frame nor the corresponding side support portion is illustrated in the drawings). The inner side frame is formed in a shape bilaterally symmetrical to the outer side frame 34.

Furthermore, the seat back frame 30 includes an upper frame (not illustrated in the drawings), which interconnects the upper end portions of the outer side frame 34 and the inner side frame in the seat width direction, and a lower frame (not illustrated in the drawings), which interconnects the lower end portions of the outer side frame 34 and the inner side frame in the seat width direction. In the following description, the side support portion 14A located on the vehicle width direction outer side of the seat back 14 will be called "the outer side portion 14A." The outer side portion 14A corresponds to the "side support portion" in the present disclosure.

The outer side frame 34 includes a side wall 34A and a rear flange 34B, and has a substantially L-shape as seen in a plan sectional view of the seat back 14. The side wall 34A extends in the seat front-rear direction as seen in a plan sectional view of the seat back 14, and the rear flange 34B extends inward in the seat width direction from the rear end of the side wall 34A. A retainer 36 is disposed on the vehicle width direction inner side of the side wall 34A and on the vehicle front side of the rear flange 34B.

The retainer 36 is formed by bending a metal plate, for example, and has a substantially U-shaped cross-section whose vehicle front side is open as seen in the plan sectional views of the seat back 14 illustrated in FIG. 2 to FIG. 5. Specifically, the retainer 36 includes a fixed wall 36A that is laid on top of the side wall 34A from the vehicle width direction inner side, a rear wall 36B that extends inward in the vehicle width direction from the rear end portion of the fixed wall 36A, and a module attachment wall 36C that extends in the vehicle forward direction from the vehicle width direction inner end portion of the rear wall 36B. The fixed wall 36A is fixed to the side wall 34A by means such as welding or bolt fastening. The rear portion of the module attachment wall 36C protrudes inward in the vehicle width direction in a substantially V-shape as seen in a plan sectional view of the seat back 14.

The rear portion of a first airbag module 38 that configures the side airbag device 20 is disposed between the fixed wall 36A and the module attachment wall 36C, and a second airbag module 54 that configures the inside airbag device 22 is disposed on the vehicle width direction inner side of the module attachment wall 36C. Furthermore, an air bladder 64 and a paddle 66, which configure the movable side support device 24, are disposed on the vehicle width direction inner side and on the vehicle front side of the first airbag module 38. The configurations of the side airbag device 20, the inside airbag device 22, the movable side support device 24, and the control device 28 will be described below.

<Configuration of Side Airbag Device 20>

As illustrated in FIG. 2 to FIG. 5, the side airbag device 20 includes a side airbag 40 (see FIG. 5; not illustrated in FIG. 2 to FIG. 4) and a first inflator 42. In the present embodiment, the side airbag 40 is a single chamber type side airbag. The side airbag 40 is formed in the shape of a bag by folding in two a single base cloth, which is formed by cutting out a nylon or polyester cloth in a substantially rectangular shape (a substantially rectangular shape with semicircular ends), and sewing its outer peripheral edge portion.

The method of manufacturing the side airbag 40 is not limited to the method described above and may be appropriately changed. For example, the side airbag 40 may also be manufactured by overlaying two base cloths on top of each other and sewing their outer peripheral edge portions together. Furthermore, for example, the side airbag 40 may also be manufactured by the double-weave technique (i.e., the one-piece woven (OPW) technique) by a weaving machine. The same applies to an inside airbag 56 described later.

Figure 3:
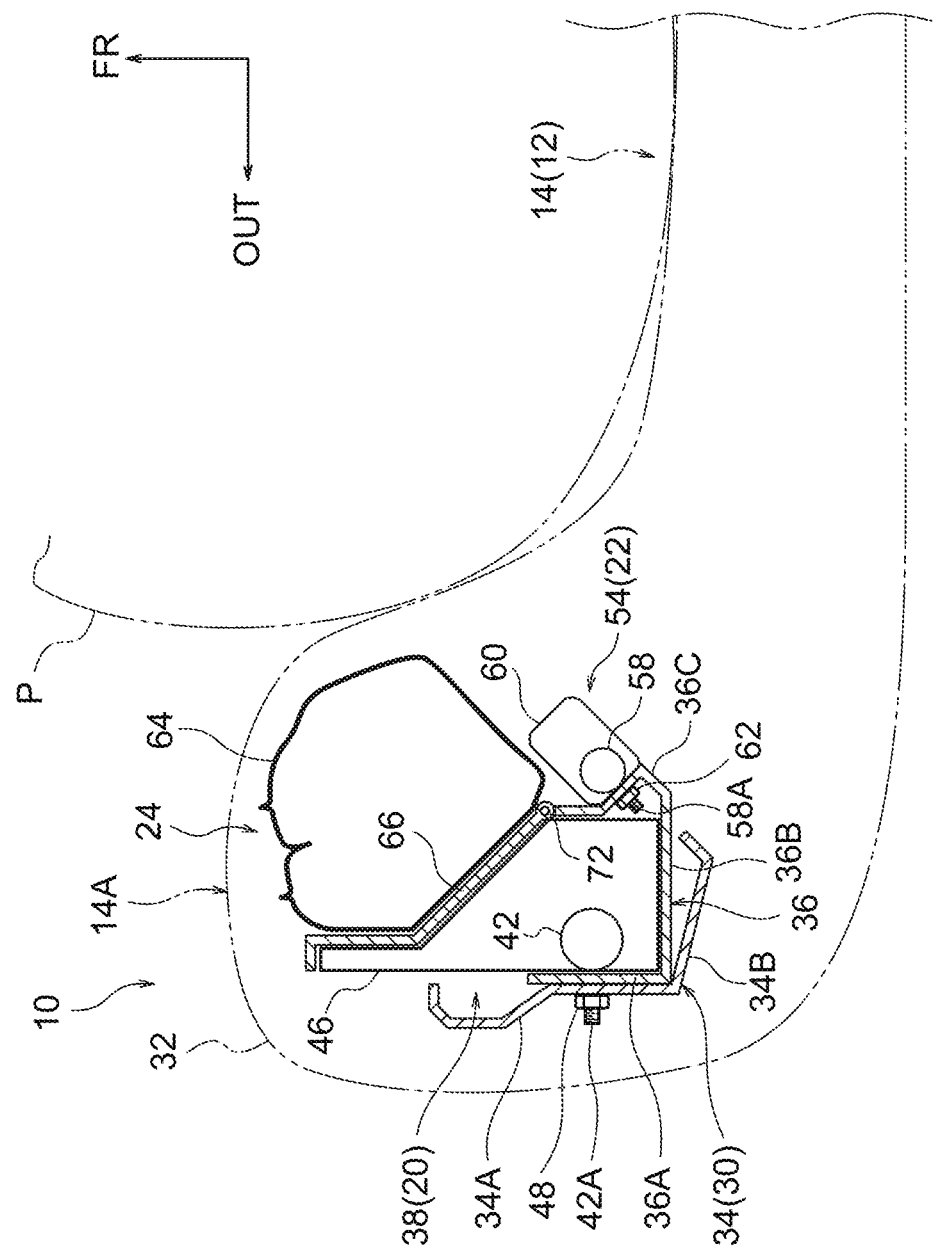
FIG. 3 is a cross-sectional view, corresponding to FIG. 2, illustrating a state in which an air bladder is inflated.
Figure 4:
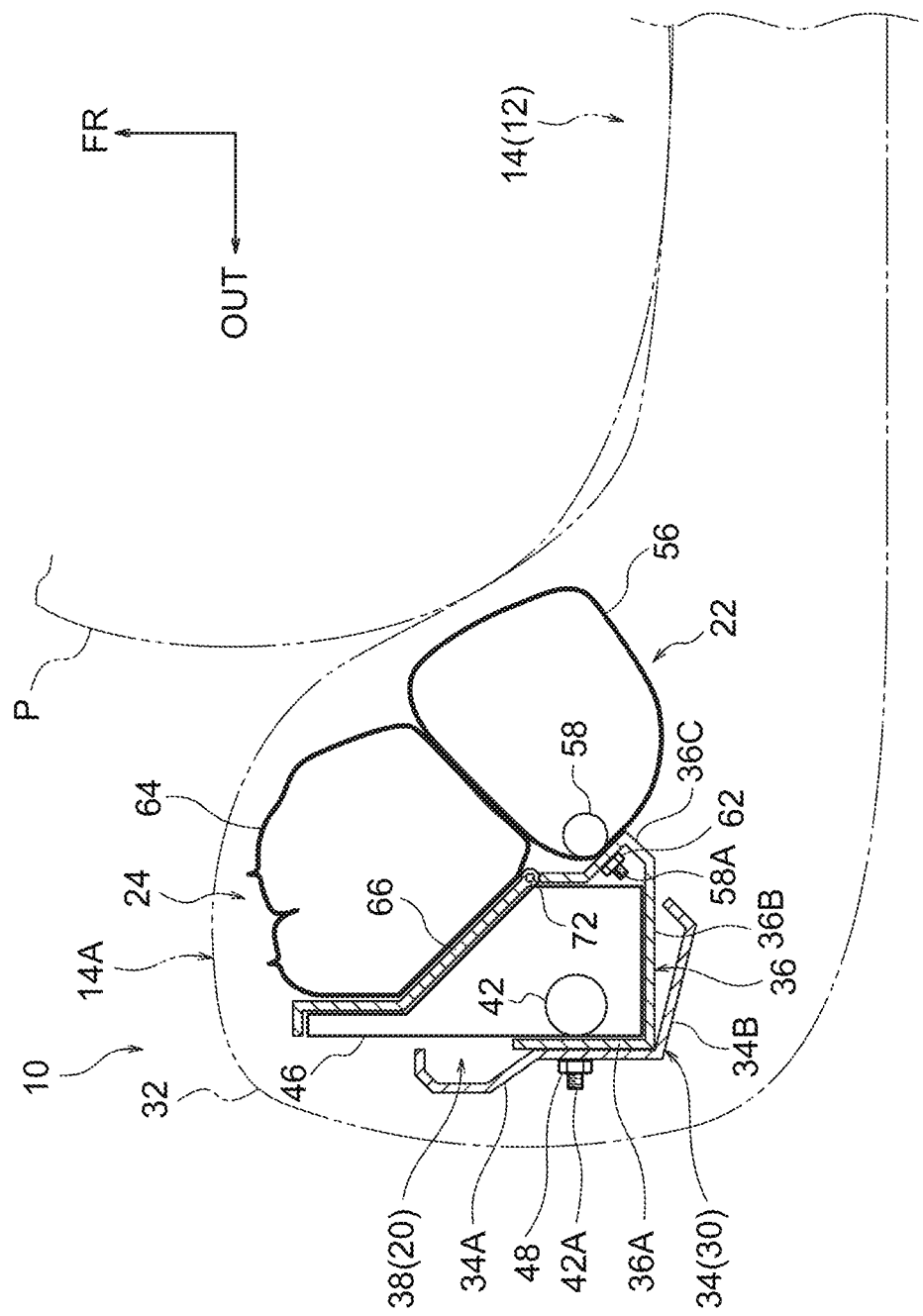
FIG. 4 is a cross-sectional view, corresponding to FIG. 3, illustrating a state in which an inside airbag is inflated and deployed.

The side airbag 40 is normally modularized together with the first inflator 42 into the first airbag module 38 illustrated in FIG. 2 to FIG. 4 and stored inside the outer side portion 14A. In the first airbag module 38, the side airbag 40 is folded up by a predetermined way of folding such as accordion folding or roll folding and is wrapped in a wrap 46 that easily ruptures. The front portion side of the first airbag module 38 is formed in such a way that its dimension in the vehicle width direction becomes smaller heading in the vehicle forward direction.

The first inflator 42 is a cylinder type inflator and is formed in a closed cylinder shape. The first inflator 42 is disposed on the vehicle width direction inner side of the side wall 34A of the outer side frame 34 and is housed in the rear end portion of the side airbag 40 in a posture such that the axial direction of the first inflator 42 lies along the vertical direction of the seat back 14. An upper and lower pair of stud bolts 42A project outward in the seat width direction from the outer peripheral portion of the first inflator 42. The stud bolts 42A penetrate the base cloth of the side airbag 40, the fixed wall 36A of the retainer 36, and the side wall 34A of the outer side frame 34, and nuts 48 are screwed onto the distal end sides of the stud bolts 42A. Thereby, the first inflator 42 is fastened and fixed to the outer side frame 34, and the side airbag 40 is attached to the outer side frame 34 using the first inflator 42.

Figure 5:
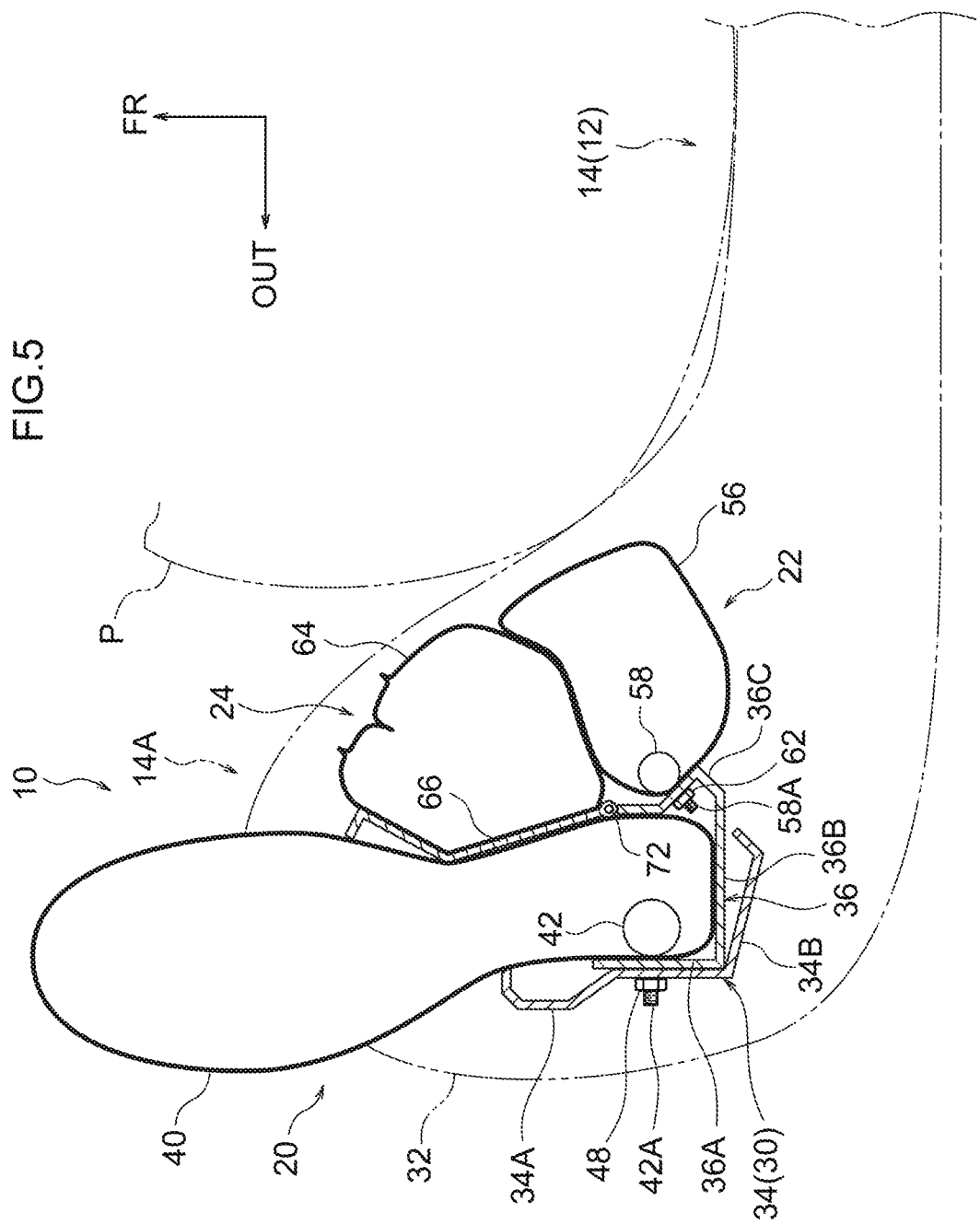
FIG. 5 is a cross-sectional view, corresponding to FIG. 4, illustrating a state in which a side airbag is inflated and deployed.

Plural gas discharge openings (not illustrated in the drawings) adjacent to each other in the circumferential direction of the first inflator 42 are formed in the upper end portion or the lower end portion of the first inflator 42, and when the first inflator 42 has been activated (started) a gas for inflation and deployment is radially discharged from the plural gas discharge openings. As a result, the gas is supplied to the inside of the side airbag 40, and as illustrated in FIG. 5 the side airbag 40 inflates and deploys in the vehicle forward direction of the outer side portion 14A and comes between the occupant P and the cabin side portion (here, a door trim 50 of a side door and a B-pillar garnish 52 illustrated in FIG. 2). The side airbag 40 in its inflated and deployed state may restrain, for example, the shoulder, chest, abdomen, and waist of the occupant P from the vehicle width direction outer side.

It should be noted that FIG. 3 to FIG. 5 do not illustrate the door trim 50 and the B-pillar garnish 52. Furthermore, at the time of the inflation and deployment of the side airbag 40, a seam (not illustrated in the drawings) provided in the seat cover 32 bursts at the front edge portion of the outer side portion 14A, and the front portion side of the side airbag 40 projects in the vehicle forward direction of the outer side portion 14A (see FIG. 5).

<Configuration of Inside Airbag Device 22>

As illustrated in FIG. 2 to FIG. 5, the inside airbag device 22 includes an inside airbag 56 (see FIG. 4 and FIG. 5; not illustrated in FIG. 2 and FIG. 3) and a second inflator 58. The inside airbag 56 is an independent airbag separate from the side airbag 40 and is a single chamber type. The inside airbag 56 is formed in a bag shape by the same manufacturing method as that of the side airbag 40.

The inside airbag 56 is normally modularized together with the second inflator 58 into the second airbag module 54 illustrated in FIG. 2 and FIG. 3 and stored inside the outer side portion 14A. In the second airbag module 54, the inside airbag 56 (not illustrated in FIG. 2 and FIG. 3) is folded up by a predetermined way of folding such as accordion folding or roll folding and is wrapped in a wrap 60 that easily ruptures. The second airbag module 54 extends obliquely inward in the vehicle width direction and in the vehicle forward direction from the module attachment wall 36C.

The second inflator 58 is an independent cylinder type inflator separate from the first inflator 42 and is formed in a closed cylinder shape. The second inflator 58 is housed in the rear end portion of the inside airbag 56 and is disposed in a posture such that the axial direction of the second inflator 58 lies along the vertical direction of the seat back 14. An upper and lower pair of stud bolts 58A project outward in the seat width direction and in the vehicle rearward direction from the outer peripheral portion of the second inflator 58. The stud bolts 58A penetrate the base cloth of the inside airbag 56 and the module attachment wall 36C of the retainer 36, and nuts 62 are screwed onto the distal end sides of the stud bolts 58A. Thereby, the second inflator 58 is fastened and fixed to the retainer 36, and the inside airbag 56 is attached to the retainer 36 using the second inflator 58.

Plural gas discharge openings (not illustrated in the drawings) adjacent to each other in the circumferential direction of the second inflator 58 are formed in the upper end portion or the lower end portion of the second inflator 58, and when the second inflator 58 has been activated (started) a gas for inflation and deployment is radially discharged from the plural gas discharge openings. As a result, the gas is supplied to the inside of the inside airbag 56, and the inside airbag 56 inflates and deploys inside the outer side portion 14A (see FIG. 4 and FIG. 5). The inside airbag 56 in its inflated and deployed state may restrain, for example, the rear portions of the shoulder and chest—that is, the shoulder blade and its surrounding area—of the occupant P.

Figure 6:
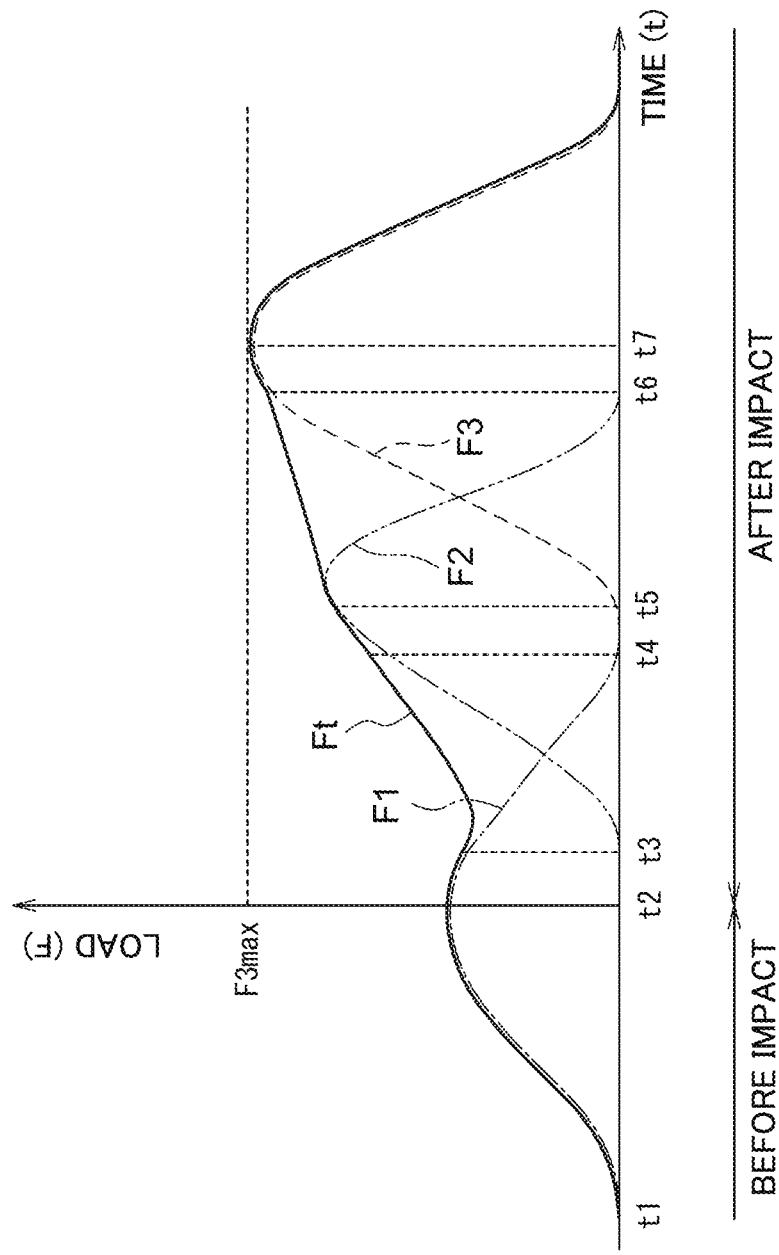
FIG. 6 is a diagram illustrating the relationship between loads acting on an occupant from the air bladder, the inside airbag, and the side airbag and time before and after the occurrence of a side impact in the first embodiment.

Furthermore, as illustrated in FIG. 6, a maximum value of a load F2 (hereinafter the load F2 may be called "the restraining load F2") that the inside airbag 56 applies to the occupant P at the time of inflation and deployment is set smaller than a maximum value F3max of a load F3 (hereinafter the load F3 may be called "the restraining load F3") that the side airbag 40 applies to the occupant P at the time of inflation and deployment. Additionally, the maximum value F3max of the restraining load F3 is set to not exceed the load resistance value of the occupant P (the upper limit value of the load that may safely restrain the occupant). In another embodiment the maximum value of the restraining load F2 may also be set larger than the maximum value of the restraining load F3. In that case, the maximum value of the restraining load F2 is set to a value that does not exceed the load resistance value of the occupant P.

<Configuration of Movable Side Support Device 24>

As illustrated in FIG. 2 to FIG. 5, the movable side support device 24 includes the air bladder 64 and the paddle 66. The air bladder 64 is formed in a bag shape by, for example, laying plural base cloths on top of each other and bonding their outer peripheral edge portions together by means such as fusing. The air bladder 64 is disposed on the vehicle width direction inner side with respect to the front portion of the first airbag module 38. As schematically illustrated in FIG. 2, an air pump 68 installed in the vehicle seat 12 is connected via an air tube 70 to the air bladder 64. The air pump 68 is a constituent member of the movable side support device 24 and is configured to include a switching valve and so forth (not illustrated in the drawings).

The air pump 68 is electrically connected to an operation switch (not illustrated in the drawings) provided on the vehicle seat 12. When the operation switch is operated to one side, the air pump 68 is activated and air is supplied to the air bladder 64. Furthermore, when the operation switch is operated to the other side, the switching valve of the air pump 68 is activated and air is vented from the air bladder 64. Because of this, the air bladder 64 is capable of being repeatedly inflated and deflated inside the outer side portion 14A. Because of this inflation and deflation of the air bladder 64, the outer side portion 14A moves toward and away from the occupant P. The air bladder 64 may, by inflating, restrain the front-rear direction middle portions of the chest and abdomen of the occupant P, for example.

The paddle 66 is made of resin or metal formed in a tabular shape and is disposed between the air bladder 64 and the first airbag module 38. The vehicle rear side end portion of the paddle 66 is coupled to the front end portion of the module attachment wall 36C via a hinge shaft 72. The hinge shaft 72 extends in the vertical direction of the seat back 14, and the paddle 66 is swingable about the hinge shaft 72 between a first position illustrated in FIG. 2 to FIG. 4 and a second position illustrated in FIG. 5. The rear portion of the paddle 66 extends obliquely in the vehicle forward direction and outward in the vehicle width direction from the hinge shaft 72. The front portion of the paddle 66 extends in the vehicle front-rear direction, and the front end portion of the paddle 66 is bent outward in the vehicle width direction on the vehicle front side of the first airbag module 38.

The paddle 66 is normally disposed in the first position illustrated in FIG. 2 to FIG. 4 and applies a reaction force from the vehicle width direction outer side to the inflating air bladder 64. Furthermore, when the side airbag 40 inflates and deploys, the air bladder 64 receives the inflation pressure of the side airbag 40 and is swung from the first position to the second position as illustrated in FIG. 5.

As illustrating in FIG. 6, a maximum value of a load F1 (hereinafter the load F1 may be called "the restraining load F1") that the air bladder 64 applies to the occupant P at the time of inflation is set smaller than the maximum value of the restraining load F2 that the inside airbag 56 applies to the occupant P at the time of inflation and deployment. That is, in the present embodiment, the restraining load F3 of the side airbag 40 by itself, the restraining load F2 of the inside airbag 56 by itself, and the restraining load F1 of the air bladder 64 by itself are all set to not exceed the load resistance value of the occupant P. It should be noted that Ft in FIG. 6 represents the load that acts on the occupant P simultaneously from both the air bladder 64 and the inside airbag 56 and the load that acts on the occupant P simultaneously from both the inside airbag 56 and the side airbag 40. Furthermore, the restraining loads F3, F2, and F1 that the side airbag 40, the inside airbag 56, and the air bladder 64 apply to the occupant P are measured by load sensors attached to the torso of the occupant P (the dummy P).

<Configuration of Control Device 28>

As schematically illustrated in FIG. 2, an electronic control unit (ECU) 74 is electrically connected to the first inflator 42, the second inflator 58, and the air pump 68. A crash sensor 76 that detects a side impact and a crash prediction sensor (a pre-crash sensor) 78 that predicts a side impact are electrically connected to the ECU 74. The ECU 74, the crash sensor 76, and the crash prediction sensor 78 configure the control device 28. It should be noted that although it is not illustrated in the drawings the crash sensor 76 is configured to include, for example, pressure sensors or acceleration sensors (in-door sensors) disposed inside the front side door and the rear side door and acceleration sensors (in-pillar sensors) disposed inside the B-pillar and inside the C-pillar. Furthermore, the crash prediction sensor 78 is configured to include, for example, at least one of a millimeter-wave radar and a stereo camera capable of monitoring the side of the vehicle.

In a case in which the ECU 74 has detected a side impact to the vehicle on the basis of output from the crash sensor 76, the ECU 74 activates the second inflator 58 before the first inflator 42 to thereby cause the inside airbag 56 to inflate and deploy before the side airbag 40. Because of this, the ECU 74 makes a load that acts on the occupant P simultaneously from both the side airbag 40 and the inside airbag 56 equal to or less than a maximum value of a load that acts on the occupant P individually from the side airbag 40 and the inside airbag 56. In the present embodiment, this maximum value is the maximum value F3max (see FIG. 6) of the restraining load F3 that acts on the occupant P from the side airbag 40.

Furthermore, in a case in which the ECU 74 has judged that a side impact to the vehicle is unavoidable on the basis of output from the crash prediction sensor 78, the ECU 74 activates the air pump 68 of the movable side support device 24 before the second inflator 58 to thereby cause the air bladder 64 to inflate before the inside airbag 56. Thereby, the ECU 74 makes a load that acts on the occupant P simultaneously from both the air bladder 64 and the inside airbag 56 equal to or less than a maximum value (F3max in FIG. 6) of a load that acts on the occupant P individually from the side airbag 40 and the inside airbag 56.

That is, in the present embodiment, the ECU 74 staggers the activation timings of the side airbag device 20, the inside airbag device 22, and the movable side support device 24 (the timings when the ECU 74 outputs activation signals to each of these devices) to thereby make a load that acts on the occupant P simultaneously from each of these devices equal to or less than a maximum value of a load that acts on the occupant P individually from each of these devices.

Figure 7:
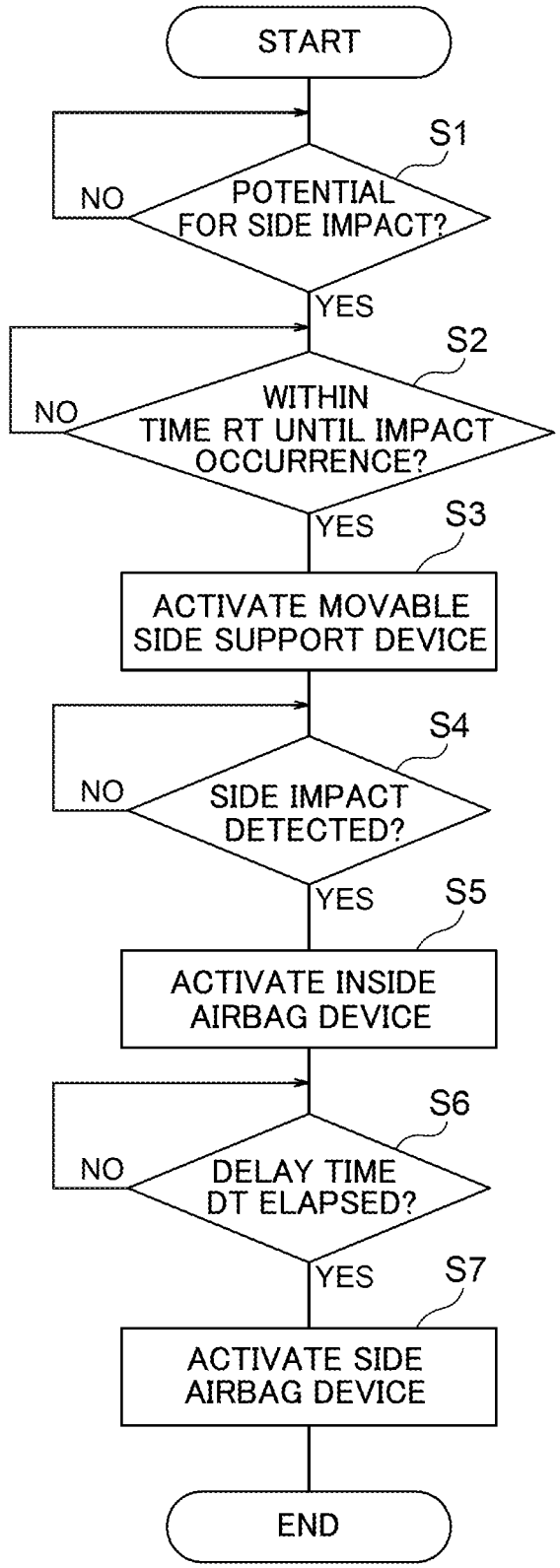
FIG. 7 is a flowchart illustrating a control flow of a control device included in the vehicle occupant restraining system pertaining to the first embodiment.

A control flow of the ECU 74 illustrated in FIG. 7 will be described below with reference to FIG. 6. First, in step S1 the ECU 74 judges whether or not there is the potential for a side impact to the vehicle on the basis of the output from the crash prediction sensor 78. The ECU 74 proceeds to step S2 in a case in which the judgment is affirmative and repeats the processing in step S1 in a case in which the judgment is negative.

In step S2 the ECU 74 judges whether or not the side impact to the vehicle is unavoidable on the basis of the output from the crash prediction sensor 78. Specifically, the ECU 74 judges whether or not the amount of remaining time until the side impact will occur is within a preset amount of time RT. The ECU 74 proceeds to step S3 in a case in which the judgment is affirmative and repeats the processing in step S2 in a case in which the judgment is negative.

In step S3 the ECU 74 outputs an activation signal to the air pump 68 of the movable side support device 24 to thereby cause the air bladder 64 to inflate. As a result, the restraining force F1 of the air bladder 64 begins to act on the occupant P starting at point in time t1 (see FIG. 6) at which leeway of a predetermined amount of time is left until the occurrence of the impact. Thus, the occupant P is restrained by the air bladder 64 starting before the occurrence of the impact. It should be noted that t2 in FIG. 6 represents the point in time when the impact occurs. After the processing in step S3 is completed, the ECU 74 moves to step S4.

In step S4 the ECU 74 judges whether or not the vehicle has been impacted from the side on the basis of the output from the crash sensor 76. The ECU 74 proceeds to step S5 in a case in which the judgment is affirmative and repeats the processing in step S4 in a case in which the judgment is negative.

In step S5 the ECU 74 outputs an activation signal to the second inflator 58 of the inside airbag device 22 to thereby cause the inside airbag 56 to inflate and deploy. As a result, the restraining load F2 of the inside airbag 56 begins to act on the occupant P starting at point in time t3 (see FIG. 6) at which a predetermined amount of time has elapsed since the occurrence of the impact, and the restraining of the occupant P is continued. At this point in time t3 the restraining load F1 of the air bladder 64 is set to start decreasing after passing a peak (maximum value). Thus, the restraining load (F1+F2; see Ft in FIG. 6) that acts on the occupant simultaneously from both the air bladder 64 and the inside airbag 56 are configured to not exceed the maximum value F3max of the restraining load F3 (the allowance value of the occupant P).

In the present embodiment, the restraining load F2 of the inside airbag 56 is configured to peak after point in time t4 (see FIG. 6) at which the restraining of the occupant P by the air bladder 64 ends, but the timing is not limited to this. That is, the timing when the restraining load F2 peaks may be changed in a range in which the restraining load (F1+F2) that acts on the occupant P simultaneously from both the air bladder 64 and the inside airbag 56 does not exceed the maximum value F3max of the restraining load F3 of the side airbag 40. After the processing in step S5 is completed, the ECU 74 moves to step S6.

In step S6 the ECU 74 judges whether or not a preset delay time DT has elapsed since the ECU 74 output the activation signal to the second inflator 58 of the inside airbag device 22. The ECU 74 proceeds to step S7 in a case in which the judgment is affirmative and repeats the processing in step S6 in a case in which the judgment is negative.

In step S7 the ECU 74 outputs an activation signal to the first inflator 42 of the side airbag device 20 to thereby cause the side airbag 40 to inflate and deploy. As a result, the restraining load F3 of the side airbag 40 begins to act on the occupant P starting at point in time t5 (see FIG. 6) at which a predetermined amount of time has elapsed since the inflation and deployment of the inside airbag 56, and the restraining of the occupant P is continued. This point in time t5 is the timing when the restraining load F2 of the inside airbag 56 is just about to peak (reach its maximum value), and is configured in such a way that the restraining load F3 increases as the restraining load F2 passes its peak and decreases.

Furthermore, in the present embodiment, as illustrated in FIG. 6, the restraining load F3 of the side airbag 40 is configured to peak (reach the maximum value F3max) at point in time t7 after point in time t6 when the restraining of the occupant P by the inside airbag 56 ends. Thus, the restraining load (F2+F3; see Ft in FIG. 6) that acts on the occupant P simultaneously from both the inside airbag 56 and the side airbag 40 is configured to not exceed the maximum value F3max of the restraining load F3 (the allowance value of the occupant P). After the processing in step S7 is completed, the control by the ECU 74 is ended.

<Operation and Effects>

Next, the operation and effects of the first embodiment will be described.

In the vehicle occupant restraining system 10 with the configuration described above, in a case in which the ECU 74 has detected a side impact to the vehicle on the basis of the output from the crash sensor 76, the ECU 74 causes the inside airbag 56 to inflate and deploy before the side airbag 40. As a result, the restraining load (F2+F3) that acts on the occupant P simultaneously from both the inside airbag 56 and the side airbag 40 is made equal to or less than the maximum value F3max of the restraining load F3 that acts on the occupant P from the side airbag 40. The maximum value F3max is set to a value that does not exceed the load resistance value of the occupant P and, therefore, the occupant P may be appropriately protected. Moreover, the maximum value F3max may be raised as far as the load resistance value of the occupant P, so it becomes possible to effectively protect the occupant P.

Figure 8:
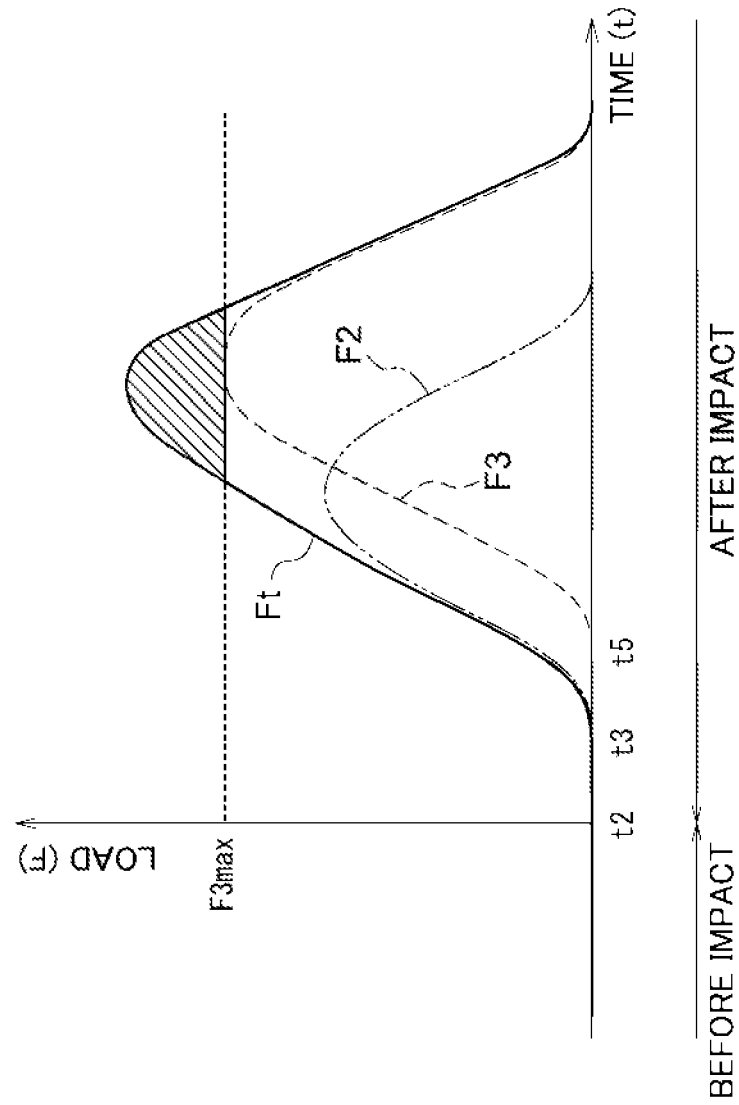
FIG. 8 is a diagram illustrating the relationship between loads acting on an occupant from the inside airbag and the side airbag and time before and after the occurrence of a side impact in a comparative example.

Description of the above effects will be supplemented using FIG. 8. FIG. 8 is a diagram illustrating the relationship between loads that act on an occupant from an inside airbag and a side airbag and time before and after the occurrence of a side impact in a comparative example in which the inside airbag and the side airbag are configured to inflate and deploy at substantially the same timing as in the side airbag device described in the "Related Art" section. In FIG. 8, F2 represents the load that acts on the occupant from the inside airbag, F3 represents the load that acts on the occupant from the side airbag, and Ft represents the load that acts on the occupant simultaneously from both the inside airbag and the side airbag (Ft=F2+F3). Furthermore, in FIG. 8, t2, t3, and t5 represent the same points in time as in FIG. 6.

In this comparative example, the load Ft that acts on the occupant simultaneously from both the inside airbag and the side airbag exceeds the maximum value F3max of the load F3 that acts on the occupant from the side airbag (see the hatched region in FIG. 8). For this reason, a measure such as lowering each of the loads that the inside airbag and the side airbag apply to the occupant individually becomes necessary. As a result, it is difficult to allow the inside airbag and the side airbag to exhibit their maximum performance. In the present embodiment this situation may be avoided.

Furthermore, in the present embodiment, in a case in which the ECU 74 has predicted a side impact to the vehicle on the basis of the output from the crash prediction sensor 78, the ECU 74 causes the air bladder 64 to inflate inside the outer side portion 14A before the inflation and deployment of the inside airbag 56. As a result, the restraining load (F1+F2) that acts on the occupant P simultaneously from both the air bladder 64 and the inside airbag 56 is made equal to or less than the maximum value F3max of the restraining load F3 of the side airbag 40. Therefore, a restraining load that exceeds the load resistance value of the occupant P may be prevented from acting on the occupant P. Moreover, the occupant P continues to be restrained over a long period by the restraining forces F1, F2, and F3 that the air bladder 64, the inside airbag 56, and the side airbag 40 sequentially apply to the occupant P, so it is possible to more effectively protect the occupant P.

Moreover, in the present embodiment, the side airbag device 20 and the inside airbag device 22 have individual inflators (the first inflator 42 and the second inflator 58) that supply a gas for inflation and deployment separately to the side airbag 40 and the inside airbag 56. The ECU 74 staggers the activation timings of the first inflator 42 and the second inflator 58 to thereby cause the inside airbag 56 to inflate and deploy before the side airbag 40. Because the vehicle occupant restraining system 10 is configured in this way, the inflation and deployment timings of the inside airbag 56 and the side airbag 40 may be arbitrarily set, and the setting of these timings is easy.

Next, a second embodiment of the present disclosure will be described. Regarding configurations and operation that are basically the same as those in the first embodiment that the same reference signs as those in the first embodiment will be assigned and description will be omitted.

<Second Embodiment>

Figure 9:
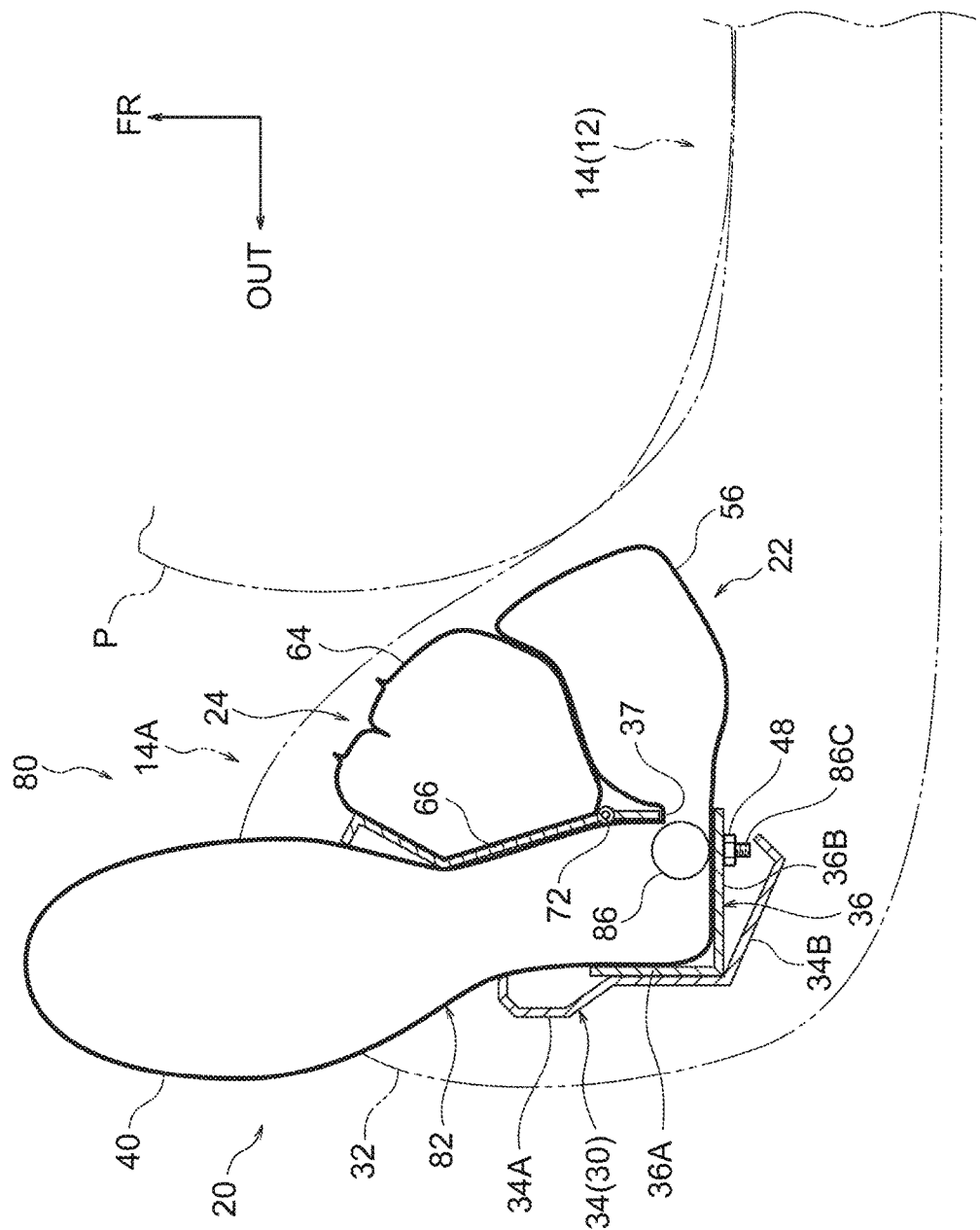
FIG. 9 is a cross-sectional view, corresponding to FIG. 5, illustrating a partial configuration of a vehicle seat to which a vehicle occupant restraining system pertaining to a second embodiment has been applied.

In FIG. 9 a partial configuration of a vehicle seat to which a vehicle occupant restraining system 80 pertaining to the second embodiment of the present disclosure has been applied is illustrated by way of a cross-sectional view corresponding to FIG. 5. Furthermore, in FIG. 10 a plan view illustrating the side airbag 40 and the inside airbag 56 pertaining to the second embodiment in a flatly spread-out state is illustrated. In the second embodiment, the side airbag 40 and the inside airbag 56 are formed in a single bag shape using a base cloth shared in common. That is, in the second embodiment, the side airbag 40 and the inside airbag 56 are configured by a single bag 82.

Figure 10:
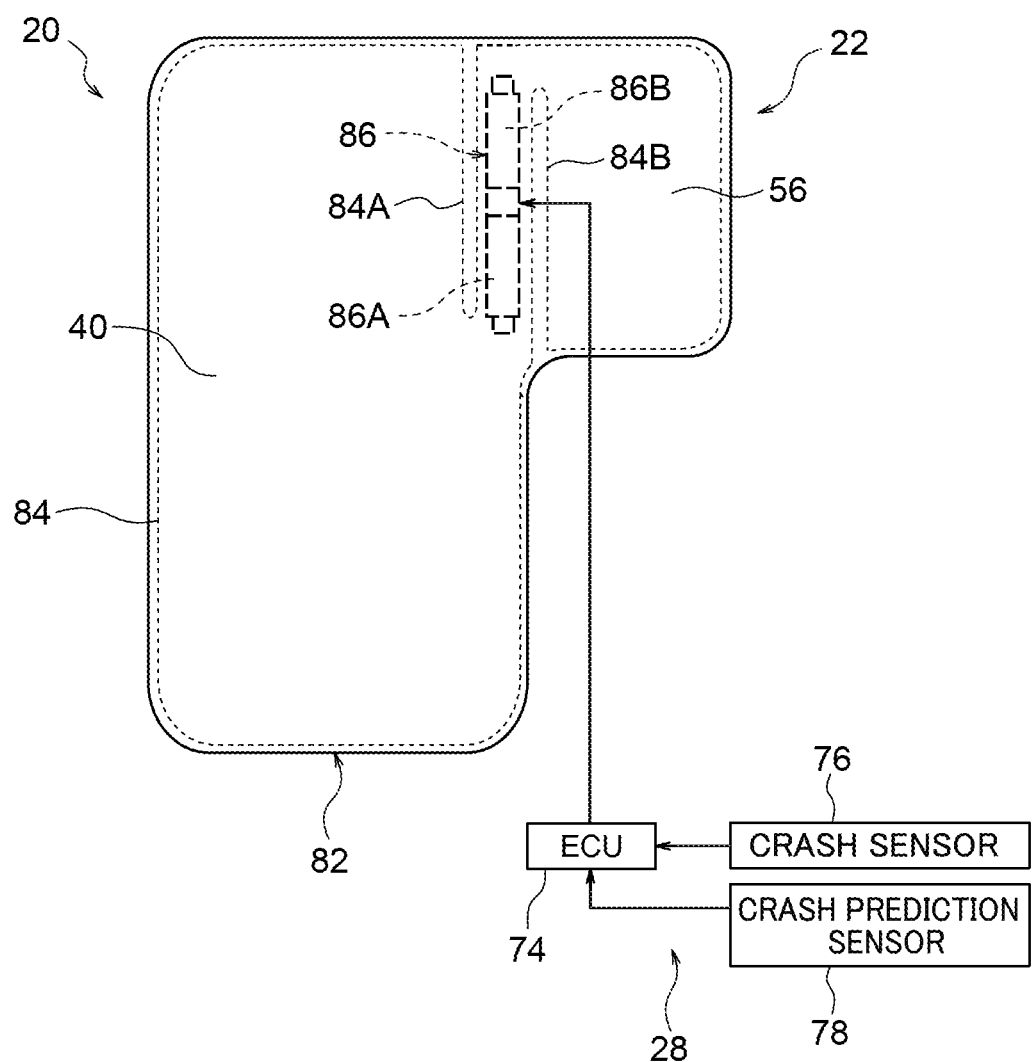
FIG. 10 is a plan view illustrating the side airbag and the inside airbag pertaining to the second embodiment in a flatly spread-out state.

The bag 82 is, as illustrated in FIG. 10, formed in a bag shape by overlaying two base cloths cut out in substantially L-shapes on top of each other and sewing their outer peripheral edge portions together at an outer peripheral seam 84 (not illustrated in FIG. 9). A single inflator 86 is housed inside the bag 82. The inflator 86 is a dual stage inflator and is disposed in the vicinity of the boundary between the side airbag 40 and the inside airbag 56.

The inflator 86 includes a first gas generating unit 86A that supplies a gas for inflation and deployment to the side airbag 40 and a second gas generating unit 86B that supplies a gas for inflation and deployment to the inside airbag 56, and the inflator 86 is shared by the side airbag device 20 and the inside airbag device 22. The inflator 86 is housed between a pair of partitioning seams 84A and 84B (not illustrated in FIG. 9) extending from the outer peripheral seam 84 of the bag 82. The pair of partitioning seams 84A and 84B partition the inside of the side airbag 40 and the inside of the inside airbag 56 from each other, but are configured to guide the gas generated by the first gas generating unit 86A into the side airbag 40 and guide the gas generated by the second gas generating unit 86B into the inside airbag 56.

As illustrated in FIG. 9, the inflator 86 is fastened and fixed to the rear wall 36B of the retainer 36 using an upper and lower pair of stud bolts 86C (only one is illustrated in FIG. 9) and nuts 48, and the bag 82 is fixed to the retainer 36 using the inflator 86. The inside airbag 56 of the bag 82 extends inward of the retainer 36 in the vehicle width direction through an open portion 37 formed in the retainer 36.

As illustrated in FIG. 10, the inflator 86 is electrically connected to the ECU 74. The ECU 74 staggers the activation timings of the first gas generating unit 86A and the second gas generating unit 86B to thereby cause the inside airbag 56 to inflate and deploy before the side airbag 40. In this embodiment, configurations other than those described above are the same as those in the first embodiment.

In the second embodiment, the ECU 74 staggers the activation timings of the first gas generating unit 86A and the second gas generating unit 86B that the single inflator 86 has as described above, so the inflation and deployment timings of the inside airbag 56 and the side airbag 40 may be arbitrarily set. Consequently, in the second embodiment, basically the same operation and effects as those in the first embodiment are obtained.

<Supplemental Description of the Embodiments>

In each of the embodiments, the vehicle occupant restraining systems 10 and 80 each have a configuration including the side airbag device 20, the inside airbag device 22, and the movable side support device 24 as plural occupant restraining devices, but the present disclosure is not limited to this. The vehicle occupant restraining systems 10 and 80 may also have a configuration in which any one of the side airbag device 20, the inside airbag device 22, and the movable side support device 24 is omitted or a configuration to which another occupant restraining device is added.

Furthermore, in the embodiments, the movable side support device 24 has the air bladder 64, but the present disclosure is not limited to this. It suffices for the movable side support device to be able to move the side support portion of the seat back toward and away from the occupant, and the movable side support device may also have a motor as a drive source, for example.

In addition, the present disclosure may be changed and implemented in a variety of ways to the extent that they do not depart from the spirit of the present disclosure. Furthermore, the scope of rights of the present disclosure is of course not limited to the embodiments.

What is claimed is:

1. A vehicle occupant restraining system comprising:
    a plurality of occupant restraining devices that are disposed in a side support portion of a seat back of a vehicle seat and are configured to, when activated, restrain an occupant; and
    a control device that is configured to stagger activation timings of the plurality of occupant restraining devices so that a load that acts on the occupant simultaneously from the plurality of occupant restraining devices is made to be equal to or less than a maximum value of a load that acts on the occupant individually from any one of the plurality of occupant restraining devices,.
    wherein the plurality of occupant restraining devices includes
        a side airbag device that is disposed in the side support portion and that is configured to inflate and deploy a side airbag between a cabin side portion and the occupant, and
        an inside airbag device that is disposed in the side support portion and that is configured to inflate and deploy an inside airbag inside the side support portion, and
    wherein the control device is configured to, in a case in which a side impact to the vehicle has been detected, inflate and deploy the inside airbag before the side airbag so that a load that acts on the occupant simultaneously from both the side airbag and the inside airbag is made to be equal to or less than a maximum value of a load that acts on the occupant individually from the side airbag.

2. The vehicle occupant restraining system according to claim 1, wherein the plurality of occupant restraining devices further comprising a movable side support device that includes an air bladder disposed inside the side support portion, the movable side support device being configured capable of repeatedly inflating and deflating the air bladder inside the side support portion, and
    wherein the control device is configured to, in a case in which it has predicted a side impact to the vehicle, inflate the air bladder before the inside airbag so that a load that acts on the occupant simultaneously from both the air bladder and the inside airbag is made to be equal to or less than a maximum value of a load that acts on the occupant individually from one of the side airbag and the inside airbag.

3. The vehicle occupant restraining system according to claim 2, wherein
    the activation timing of the inside airbag device is set at a time point when a restraining load of the movable side support device decreases after passing a peak value.

4. The vehicle occupant restraining system according to claim 2, wherein
    a peak of a restraining load of the inside airbag device is set at a time point after a restraining load of the movable side support device ceases.

5. The vehicle occupant restraining system according to claim 2, wherein
    the activation timing of the side airbag device is set at a time point immediately before a peak of the restraining load of the inside airbag device occurs.

6. The vehicle occupant restraining system according to claim 2, wherein
    a peak of a restraining load of the side airbag device is set at a time point after a restraining load of the inside airbag device ceases.

7. The vehicle occupant restraining system according to claim 1, wherein
    each of the side airbag device and the inside airbag device includes an individual inflator that is configured to supply a gas for inflation and deployment separately to the side airbag or the inside airbag, and
    the control device is configured to stagger the activation timings of the individual inflators so that the inside airbag inflates and deploys before the side airbag.

8. The vehicle occupant restraining system according to claim 1, wherein
    the side airbag device and the inside airbag device jointly includes a single inflator including a first gas generating unit that is configured to supply a gas for inflation and deployment to the side airbag and a second gas generating unit that is configured to supply a gas for inflation and deployment to the inside airbag, and
    the control device is configured to stagger the activation timings of the first gas generating unit and the second gas generating unit so that the inside airbag inflates and deploys before the side airbag.

* * * * *